(12) United States Patent
Takano

(10) Patent No.: US 10,356,403 B2
(45) Date of Patent: Jul. 16, 2019

(54) HIERARCHIAL VIDEO CODE BLOCK MERGING USING DEPTH-DEPENDENT THRESHOLD FOR BLOCK MERGER

(71) Applicant: NEC Corporation, Tokyo (JP)

(72) Inventor: Fumiyo Takano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 214 days.

(21) Appl. No.: 15/506,803

(22) PCT Filed: Aug. 27, 2015

(86) PCT No.: PCT/JP2015/004324
§ 371 (c)(1),
(2) Date: Feb. 27, 2017

(87) PCT Pub. No.: WO2016/031253
PCT Pub. Date: Mar. 3, 2016

(65) Prior Publication Data
US 2017/0257631 A1    Sep. 7, 2017

(30) Foreign Application Priority Data
Aug. 28, 2014  (JP) ................. 2014-173698

(51) Int. Cl.
*H04N 19/119*  (2014.01)
*H04N 19/53*  (2014.01)
(Continued)

(52) U.S. Cl.
CPC ......... *H04N 19/119* (2014.11); *H04N 19/139* (2014.11); *H04N 19/176* (2014.11); *H04N 19/192* (2014.11); *H04N 19/53* (2014.11)

(58) Field of Classification Search
CPC ............................ H04N 19/119; H04N 19/53
See application file for complete search history.

(56) References Cited

U.S. PATENT DOCUMENTS 6,084,908 A * 7/2000 Chiang ............... G06T 7/20
348/E5.066
2008/0126278 A1* 5/2008 Bronstein ........... H04N 19/176
706/17
(Continued)

FOREIGN PATENT DOCUMENTS

EP         691789 A2 * 10/1996 ............ H04N 7/26
JP       2001-078197 A     3/2001
(Continued)

OTHER PUBLICATIONS

ITU-T Recommendation H.265 "High efficiency video coding", Apr. 2013. (https://www.itu.int/rec/T-REC-H.265).
(Continued)

*Primary Examiner* — Jamie J Atala
*Assistant Examiner* — Michael Robert Cammarata
(74) *Attorney, Agent, or Firm* — Sughrue Mion, PLLC

(57) ABSTRACT

A computer executing: a vector search process for determining motion information for each of the smallest blocks, which are the blocks in a predetermined deepest layer; a block size determination process for determining the block size, which is the unit in which the motion information is to be held; and a block integration process for determining whether to integrate mutually adjacent sub-blocks with a single block having a single piece of motion information, based on integration conditions including at least the motion information of the sub-blocks which are the blocks in a layer one layer deeper than the layer currently being considered; wherein the block size determination process determines the block size by carrying out the block integration process in layers, in a sequence from the blocks in a layer one level shallower than the smallest blocks, to the largest blocks, which are the blocks in a predetermined shallowest layer.

8 Claims, 24 Drawing Sheets

(51) Int. Cl.
*H04N 19/139* (2014.01)
*H04N 19/176* (2014.01)
*H04N 19/192* (2014.01)

(56) References Cited

U.S. PATENT DOCUMENTS

| | | | |
|---|---|---|---|
| 2010/0322315 A1 | 12/2010 | Hasuo | |
| 2011/0129015 A1* | 6/2011 | Nguyen | H04N 19/51 375/240.16 |
| 2013/0010869 A1* | 1/2013 | Sugio | H04N 19/197 375/240.16 |
| 2014/0003495 A1* | 1/2014 | Chuang | H04N 19/51 375/240.02 |
| 2014/0177726 A1 | 6/2014 | Okajima | |
| 2014/0321548 A1* | 10/2014 | Park | H04N 19/521 375/240.16 |
| 2016/0165263 A1* | 6/2016 | Zhang | H04N 19/597 375/240.12 |
| 2016/0191920 A1* | 6/2016 | Kim | H04N 19/176 375/240.13 |

FOREIGN PATENT DOCUMENTS

| | | |
|---|---|---|
| JP | 2005-012439 A | 1/2005 |
| JP | 2009-182792 A | 8/2009 |
| JP | 2011-130265 A | 6/2011 |
| JP | 2011130265 * | 6/2011 |
| JP | 2012-257148 A | 12/2012 |
| WO | 2013/031071 A1 | 3/2013 |

OTHER PUBLICATIONS

Felipe Sampaio et al., "Motion Vectors Merging: Low Complexity Prediction Unit Decision Heuristic for the Inter-Prediction of HEVC Encoders", 2012 IEEE International Conference on Multimedia and Expo. p. 657-662. (http://ieeexplore.ieee.org/document/6298477/).
International Search Report of PCT/JP2015/004324 dated Nov. 24, 2015 [PCT/ISA/210].
Written Opinion of PCT/JP2015/004324 dated Nov. 24, 2015 [PCT/ISA/237].

* cited by examiner

Fig.13

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47B | 48C | 48D | 59C | 59D | 60C | 60D | 63C | 63D | 64C | 64D |

Fig.14

| 1A | 1B | 2A | 2B | 5A | 5B | 6A | 6B | 17A | 17B | 18A | 18B | 21A | 21B | 22A | 22B |
|---|---|---|---|---|---|---|---|---|---|---|---|---|---|---|---|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47B | 48C | 48D | 59C | 59D | 60C | 60D | 63C | 63D | 64C | 64D |

Fig.15

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.16

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47B | 48C | 48D | 59C | 59D | 60C | 60D | 63C | 63D | 64C | 64D |

Fig.17

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47B | 48C | 48D | 59C | 59D | 60C | 60D | 63C | 63D | 64C | 64D |

Fig.18

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47B | 48C | 48D | 59C | 59D | 60C | 60D | 63C | 63D | 64C | 64D |

Fig.19

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.20

| 1A | 1B | 2A | 2B | 5A | 5B | 6A | 6B | 17A | 17B | 18A | 18B | 21A | 21B | 22A | 22B |
|---|---|---|---|---|---|---|---|---|---|---|---|---|---|---|---|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.21

| 1A | 1B | 2A | 2B | 5A | 5B | 6A | 6B | 17A | 17B | 18A | 18B | 21A | 21B | 22A | 22B |
|---|---|---|---|---|---|---|---|---|---|---|---|---|---|---|---|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.22

| 1A | 1B | 2A | 2B | 5A | 5B | 6A | 6B | 17A | 17B | 18A | 18B | 21A | 21B | 22A | 22B |
|---|---|---|---|---|---|---|---|---|---|---|---|---|---|---|---|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.23

| 1A | 1B | 2A | 2B | 5A | 5B | 6A | 6B | 17A | 17B | 18A | 18B | 21A | 21B | 22A | 22B |
|---|---|---|---|---|---|---|---|---|---|---|---|---|---|---|---|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.24

| 1A | 1B | 2A | 2B | 5A | 5B | 6A | 6B | 17A | 17B | 18A | 18B | 21A | 21B | 22A | 22B |
|---|---|---|---|---|---|---|---|---|---|---|---|---|---|---|---|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 35D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47D | 48C | 48D | 59C | 59D | 60C | 60D | 63C | 63D | 64C | 64D |

Fig.25

| 1A | 1B | 2A | 2B | 5A | 5B | 6A | 6B | 17A | 17B | 18A | 18B | 21A | 21B | 22A | 22B |
|----|----|----|----|----|----|----|----|-----|-----|-----|-----|-----|-----|-----|-----|
| 1C | 1D | 2C | 2D | 5C | 5D | 6C | 6D | 17C | 17D | 18C | 18D | 21C | 21D | 22C | 22D |
| 3A | 3B | 4A | 4B | 7A | 7B | 8A | 8B | 19A | 19B | 20A | 20B | 23A | 23B | 24A | 24B |
| 3C | 3D | 4C | 4D | 7C | 7D | 8C | 8D | 19C | 19D | 20C | 20D | 23C | 23D | 24C | 24D |
| 9A | 9B | 10A | 10B | 13A | 13B | 14A | 14B | 25A | 25B | 26A | 26B | 29A | 29B | 30A | 30B |
| 9C | 9D | 10C | 10D | 13C | 13D | 14C | 14D | 25C | 25D | 26C | 26D | 29C | 29D | 30C | 30D |
| 11A | 11B | 12A | 12B | 15A | 15B | 16A | 16B | 27A | 27B | 28A | 28B | 31A | 31B | 32A | 32B |
| 11C | 11D | 12C | 12D | 15C | 15D | 16C | 16D | 27C | 27D | 28C | 28D | 31C | 31D | 32C | 32D |
| 33A | 33B | 34A | 34B | 37A | 37B | 38A | 38B | 49A | 49B | 50A | 50B | 53A | 53B | 54A | 54B |
| 33C | 33D | 34C | 34D | 37C | 37D | 38C | 38D | 49C | 49D | 50C | 50D | 53C | 53D | 54C | 54D |
| 35A | 35B | 36A | 36B | 39A | 39B | 40A | 40B | 51A | 51B | 52A | 52B | 55A | 55B | 56A | 56B |
| 35C | 35D | 36C | 36D | 39C | 39D | 40C | 40D | 51C | 51D | 52C | 52D | 55C | 55D | 56C | 56D |
| 41A | 41B | 42A | 42B | 45A | 45B | 46A | 46B | 57A | 57B | 58A | 58B | 61A | 61B | 62A | 62B |
| 41C | 41D | 42C | 42D | 45C | 45D | 46C | 46D | 57C | 57D | 58C | 58D | 61C | 61D | 62C | 62D |
| 43A | 43B | 44A | 44B | 47A | 47B | 48A | 48B | 59A | 59B | 60A | 60B | 63A | 63B | 64A | 64B |
| 43C | 43D | 44C | 44D | 47C | 47B | 48C | 48D | 59C | 59D | 60C | 60D | 63C | 63D | 64C | 64D |

HIERARCHIAL VIDEO CODE BLOCK MERGING USING DEPTH-DEPENDENT THRESHOLD FOR BLOCK MERGER

CROSS REFERENCE TO RELATED APPLICATIONS

This application is a National Stage of International Application No. PCT/JP2015/004324, filed Aug. 27, 2015, claiming priority based on Japanese Patent Application No. 2014-173698, filed Aug. 28, 2014, the contents of all of which are incorporated herein by reference in their entirety.

TECHNICAL FIELD

The present invention relates to video coding. The present invention particularly relates to video coding that, without reducing coding efficiency, reduces the amount of computation.

BACKGROUND ART

Recent years, demand for increasing the resolution of video has been increasingly intensifying. To respond to such demand, in coding methods, such as MPEG-2, H.264/MPEG-4 AVC (hereinafter, H.264), and H.265/HEVC (hereinafter, H.265), the later the coding method appear, the more the compression efficiency.

These coding methods compress information by use of motion compensation prediction between frames to achieve a high coding efficiency. The motion compensation prediction is a technology for compressing video information by compensating an image in a reference frame with use of motion information between a coding target frame and a reference frame that has already been coded, and coding only difference information between the compensated image (predicted image) and a current image to be coded and the information representing a motion between the frames.

A motion between frames is represented by a motion vector that expresses a magnitude of displacement (see, for example, PTL 1). Processing of calculating motion information between the reference frame and the coding target frame is referred to as motion estimation. In the motion estimation, it is important to calculate motion information so as to, while suppressing the amount of noise generated in a decoded image, minimize the amount of information to be coded. Therefore, a method referred to as RD optimization (Rate-Distortion Optimization) has been popularly used in recent video coding devices.

In general, in the RD optimization, a lot of motion vector candidates are assumed with respect to a block on which attention is focused, and a Rate-Distortion cost (RD cost), expressed by $J=D+\lambda R$, is calculated for each of the motion vector candidates. Subsequently, a motion vector candidate that minimizes the RD cost is chosen as the motion vector of the block on which attention is focused. It is assumed that processing of calculating an RD cost for each motion vector candidate to generate a motion vector of a block on which attention is focused in the manner described above is referred to as motion vector search. In the above equation, D, R, and $\lambda$ denote the amount of distortion generated in a difference image, the amount of code produced in coding of motion information, and a weighting factor that depends on the complexity of an image and the like, respectively. Motion information includes motion vector information. In the motion vector search, because of calculating an RD cost with respect to each of a lot of motion vector candidates, the amount of computation increases substantially.

In NPL 1, details of processing based on the H.265 standard are described. Processing in accordance with the H.265 video coding standard is performed in units of block of maximally 64×64 pixels, which is referred to as a CU (Coding Unit). In H.265/HEVC, using variable CU size has made it possible to compress the amount of code efficiently. An optimal CU size is selected out of the CUs of 32×32, 16×16, and 8×8 pixel sizes, into which, as illustrated in FIG. 7, a 64×64 block, which has the largest size, is partitioned hierarchically by means of quad-tree segmentation.

In the H.265 standard, motion estimation is performed by partitioning a CU into a PU(s) (Prediction Unit). A PU is a unit for retaining motion information. As illustrated in FIG. 8, when the size of a CU is assumed to be 2N×2N, the PU is partitioned into a PU(s) that has/have an optimal block size out of 2N×2N, 2N×N, N×2N, and N×N. It is assumed that the above four types of partitioning are collectively referred to as PU partitioning. Making the sizes of CU and PU variable as described above and coding a level portion in a large block enable the amount of code of motion information to be reduced. On the other hand, coding a portion including small variation in a small block enables the amount of distortion in a difference image to be reduced. With this configuration, it is possible to reduce an RD cost $J=D+\lambda R$, which is defined by an amount R of code produced by coding of motion information and an amount D of distortion generated in a difference image.

A simple method for selecting optimal CU partitioning and PU partitioning is as follows.

(A1) A 64×64 size block is assumed as a CU. It is assumed that the following processing of steps (A2) to (A6) are referred to as processing at a CU layer depth of 1 (depth=1).

(A2) With respect to the block assumed to be a CU, four types of PU partitioning illustrated in FIG. 8 are supposed.

(A3) In each of the four types of PU partitioning supposed in (A2), a motion vector search is performed for each PU. The size of a CU is assumed to be 2N×2N. In this case, a motion vector of a PU into which the CU is assumed to be transformed as it is, that is, of a 2N×2N size PU, is obtained. Motion vectors of respective upper and lower PUs into which the CU is assumed to be halved vertically, that is, two 2N×N PUs, are also obtained. Motion vectors of respective right and left PUs into which the CU is assumed to be halved horizontally, that is, two N×2N PUs, are also obtained. Motion vectors of respective four N×N PUs into which the CU is assumed to be partitioned by means of quad-tree segmentation are also obtained.

(A4) Based on the motion vectors of the respective PUs obtained in (A3), the total of RD costs for each type of PU partitioning is obtained. Since an RD cost is obtained for the 2N×2N size PU, the RD cost becomes the total as it is. It is assumed that the RD cost is denoted by J (2N×2N). Since two RD costs are obtained for the 2N×N size PUs, both RD costs are totaled. It is assumed that the total is denoted by J (2N×N). The same applies to the N×2N size PUs, and it is assumed that the total of two RD costs therefor is denoted by J (N×2N). Since four RD costs are obtained for the N×N size PUs, the four RD costs are totaled. It is assumed that the total is denoted by J (N×N).

(A5) A type of PU partitioning that minimizes the total of RD costs obtained in (A4) is obtained. That is, a type of PU partitioning that corresponds to the smallest total RD cost among J(2N×2N), J(2N×N), J (N×2N), and J (N×N) is obtained.

(A6) Four 32×32 size blocks into which the 64×64 size block is partitioned by means of quad-tree segmentation are considered, and each of the blocks is assumed to be a CU. For each of the four 32×32 size blocks, the processing of steps (A2) to (A5) are performed. It is assumed that this processing is referred to as processing at a CU layer depth of 2 (depth=2).

(A7) Four 32×32 size blocks into which the 64×64 size block is partitioned by means of quad-tree segmentation are considered, and the 32×32 size blocks are further partitioned by means of quad-tree segmentation. That is, each of, in total, 16 blocks having 16×16 size that are obtained by partitioning the 64×64 size block by means of two stages of quad-tree segmentation is assumed to be a CU. For each of the 16 blocks having 16×16 size, the processing of steps (A2) to (A5) are performed. It is assumed that this processing is referred to as processing at a CU layer depth of 3 (depth=3).

(A8) Each of, in total, 64 blocks having 8×8 size that are obtained by partitioning the 64×64 size block by means of three stages of quad-tree segmentation is assumed to be a CU, and the processing steps (A2) to (A5) are performed. It is assumed that this processing is referred to as processing at a CU layer depth of 4 (depth=4).

(A9) Based on the results from the processing of steps (A1) to (A8), CU partitioning that minimizes the total of RD costs over the whole of the 64×64 block is obtained.

Selection of a CU size and a PU size substantially influences image quality. On the other hand, performing motion vector search processing corresponding to a lot of CU sizes and PU sizes one by one causes the amount of computation to increase substantially. In particular, in implementing a practical encoder for high-definition video such as 4K, it is not practical to perform motion vector searches with all the CU sizes and PU sizes. Since, in H.265, the number of selectable types of block sizes has increased to 13 from seven types of block sizes in H.264, the amount of computation has further increased.

A technology for suppressing such an increase in the amount of computation is described in NPL 2. In MVM (Motion Vector Merging) described in NPL 2, pieces of motion information are first obtained for small size blocks by means of motion vector search. Next, pieces of motion information are compared between adjacent blocks, and, when the compared pieces of motion information coincide with each other, the adjacent blocks are merged and the merged block is considered as a large block. This operation enables the amount of computation to be suppressed.

In more detail, motion vector searches with respect to N×N size PUs is first performed. As illustrated in FIG. 9, when three motion vectors out of the motion vectors of four N×N size blocks are the same, the four N×N blocks are merged into a 2N×2N size block. When pieces of motion information of two blocks adjacent to each other laterally are the same, the four N×N blocks are merged into two 2N×N blocks. When pieces of motion information of two blocks adjacent to each other longitudinally are the same, the four N×N blocks are merged into two N×2N blocks.

As described above, when pieces of motion information are mutually the same between adjacent blocks, merging of the adjacent blocks is determined and the motion information is regarded to be the motion information of a block into which the adjacent blocks are merged. Thus, motion vector searches with respect to 2N×2N, 2N×N, and N×2N size blocks in step (A3) of the above-described method do not need to be performed, and a motion vector search is performed only with respect to N×N size blocks.

Since merging of blocks is determined depending on a comparison of motion information between adjacent blocks, it is not needed to perform steps (A4) and (A5) in the above-described method. That is because a proper type of PU partitioning can be selected based on only comparison of motion information without comparing the totals of RD costs for respective types of PU partitioning.

Referring to a flowchart in FIG. 11, block size determination processing disclosed in NPL 2 will be described. "block" denotes a variable that indicates a block for which coding is to be performed. In addition, "depth" denotes a natural number not less than 1 and not greater than 4 that indicates a CU layer depth and an initial value thereof is 1. Moreover, "2N" denotes a block size and equal to any of 64, 32, 16, and 8, and an initial value thereof is 64. As will be described later, the block size determination processing is processing that includes a recursive call.

In step S1101, whether "depth" is maximum, that is, whether "depth" indicates a layer of smallest size blocks, is determined. If depth=4 is given, the result of the determination is true, and, if depth=1, 2, or 3 is given, the result of the determination is false.

When the determination result is true, that is, "depth" indicates the layer of smallest size blocks, the process proceeds to step S1103, which will be described later.

On the other hand, if the result of determination in step S1101 is false, that is, "depth" does not indicate the layer of smallest size blocks, block size determination processing is performed on each of four sub-blocks, "subblock[1]", "subblock[2]", "subblock[3]", and "subblock[4]", that are created by partitioning a block on which attention is focused by means of quad-tree segmentation (step S1102). The block size determination processing is performed as a recursive call that calls the block size determination processing itself. In other words, when a CU layer depth is 1, 2, or 3 (depth=1, 2, 3), the recursive call that calls the block size processing itself is performed. Since a sub-block "subblock[i]" comes to have a CU layer depth deeper by one than that of the block on which attention is currently focused, +1 is added to the argument "depth" in the block size determination processing having been called recursively. While, as described above, an argument indicating the size of the block on which attention is currently focused is "2N", an argument indicating the size of the sub-block "subblock[i]" is "N".

In step S1103, a motion vector search is performed on each of the sub-blocks "subblock[1]", "subblock[2]", "subblock[3]", and "subblock[4]", into which the block "block" is partitioned by means of quad-tree segmentation. When the determination in step S1101 results in true and the process has proceeded from step S1101, that is, when depth=4 is given and the block size is 8×8, a motion vector search is performed on each of 4×4 blocks that are sub-block thereof.

In step S1104, based on the motion information of the respective sub-blocks that are obtained in step S1103, processing of block merging is performed and a best block size "bestPart" is determined. Although details will be described later, the block merging processing returns any of 2N×2N, 2N×N, N×2N, and N×N as the best block size "bestPart".

In step S1105, comparison in magnitude between an RD cost "bestPartCost" at the best block size "bestPart" and a cost that has been best "minCost" is performed. When the RD cost "bestPartCost" is smaller than the best cost "minCost" (y in step S1105), the best cost "minCost" is updated with the value of the RD cost "bestPartCost" and a best depth "bestDepth" is updated with the value of the CU layer depth at which the block size determination processing is currently being performed (step S1106).

Next, an operation of the block merging processing in step S1104 will be described with reference to FIG. 12. In the block merging processing, four blocks "block" are taken as an argument. The blocks indicated by the argument "block" here is, however, equivalent to "subblock[i]" illustrated in the flowchart in FIG. 11.

In step S1002, based on motion information having been obtained in advance with respect to four blocks specified as the argument, whether the blocks can be merged into a 2N×2N size block is determined. When determined the blocks can be merged (y in step S1002), 2N×2N is returned as the best block size "bestPart". In NPL 2, a condition for merging the four blocks into a 2N×2N block is defined such that the motion vectors of three blocks out of the four blocks are the same.

In step S1003, based on the motion information having been obtained in advance with respect to the four blocks specified as the argument, whether the blocks can be merged into 2N×N size blocks is determined (y in step S1003). When determined the blocks can be merged, 2N×N is returned as the best block size "bestPart". In NPL 2, a condition for merging into 2N×N blocks is defined such that, when two blocks laterally adjacent to each other are considered as a pair, the motion vectors of the blocks composing the pair are the same.

In step S1004, based on the motion information having been obtained in advance with respect to the four blocks specified as the argument, whether the blocks can be merged into N×2N size blocks is determined. When determined the blocks can be merged (y in step S1004), N×2N is returned as the best block size "bestPart". In NPL 2, a condition for merging the four blocks into N×2N blocks is defined such that, when two blocks adjacent to each other longitudinally are considered as a pair, the motion vectors of the blocks composing the pair are the same.

When determined the blocks do not apply to any of merging conditions in steps S1002, S1003, and S1004, N×N is returned as the best block size "bestPart".

In the block size determination processing, a motion vector search is performed at the following timings.

First, the block size determination processing at a depth of 4 (depth=4) is performed. In this case, in step S1103, motion vector searches targeting a 8×8 size block 1 (FIG. 14), a 8×8 size block 2 (FIG. 15), a 8×8 size block 3 (FIG. 16), and a 8×8 size block 4 (FIG. 17) are performed. Sub-blocks targeted by the motion vector searches at a depth of 4 (depth=4) are 4×4 size blocks.

Next, targeting a 16×16 size block made up of the 8×8 size blocks 1 to 4 (FIG. 18), the block size determination processing at a depth of 3 (depth=3) is performed. In this case, in step S1103, motion vector searches are performed considering the 8×8 size blocks as sub-blocks.

As with the block size determination processing at a depth of 4 (depth=4) targeting the 8×8 size blocks 1 to 4, the block size determination processing at a depth of 4 (depth=4) targeting each of 8×8 size blocks 5 to 8 is performed. Further, block size determination processing at a depth of 3 (depth=3) targeting a 16×16 size block made up of the 8×8 size blocks 5 to 8 (FIG. 19) is performed. The block size determination processing at a depth of 4 (depth=4) is also performed with respect to each of 8×8 size blocks 9 to 12, and the block size determination processing at a depth of 3 (depth=3) targeting a 16×16 size block made up of the 8×8 size blocks 9 to 12 (FIG. 20) is performed. Furthermore, the block size determination processing at a depth of 4 (depth=4) targeting each of 8×8 size blocks 13 to 16 is performed, and the block size determination processing at a depth of 3 (depth=3) targeting a 16×16 size block made up of the 8×8 size blocks 13 to 16 (FIG. 21) is performed.

Next, the block size determination processing at a depth of 2 (depth=2) targeting a 32×32 size block made up of the 8×8 size blocks 1 to 16 (FIG. 22) is performed. Sub-blocks with respect to which the motion vector search at a depth of 2 (depth=2) in step S1103 is performed are 16×16 size blocks.

The above-described block size determination processing at depths of 4, 3, and 2 (depth=4, 3, 2) targeting the 8×8 size blocks 1 to 16 is also performed targeting each of 8×8 size blocks 17 to 32, 8×8 size blocks 33 to 48, and 8×8 size blocks 49 to 64.

Last, the block size determination processing at a depth of 1 (depth=1) targeting a 64×64 size block made up of all the blocks, that is, the 8×8 size blocks 1 to 64, is performed. Sub-blocks with respect to which the motion vector search at a depth of 1 (depth=1) is performed are 32×32 size blocks.

As described above, the block size determination processing disclosed in NPL 2 includes a step (step S1103) in which a motion vector search is performed with respect to each of the sub-blocks at a CU layer depth "depth" on which attention is currently focused. Motion vector searches are performed targeting 4×4 size blocks, 8×8 size blocks, 16×16 size blocks, and 32×32 size blocks at depths of 4, 3, 2, and 1 (depth=4, 3, 2, and 1), respectively.

CITATION LIST

Patent Literature

[PTL 1] JP 2012-257148 A

Non Patent Literature

[NPL 1] ITU-T Recommendation H.265 "High efficiency video coding", April 2013.

[NPL 2] Felipe Sampaio, Sergio Bampi, Mateus Grellert, Luciano Agostini, Julio Mattos, "Motion Vectors Merging: Low Complexity Prediction Unit Decision Heuristic for the Inter-Prediction of HEVC Encoders", 2012 IEEE International Conference on Multimedia and Expo. p. 658-662

SUMMARY OF INVENTION

Technical Problem

As a result of intensive studies, the present inventor found that there is room for further reducing an amount of computation required for block size determination processing.

As described above, in the block size determination processing disclosed in NPL 2, a block is partitioned into four sub-blocks by means of quad-tree segmentation and a motion vector search is performed with respect to each of the sub-blocks at a specified CU layer depth. It was clarified that redundant motion vector searches are included in the method.

In the block size determination processing at a depth of 4, a motion vector search with respect to 8×8 size block is performed in step S1103. On the other hand, while, in step S1103 in the block size determination processing at a depth of 3, a motion vector search is performed with respect to each of the sub-blocks of a 16×16 size block, the sub-blocks are 8×8 size blocks. As a consequence, motion vector searches with respect to 8×8 size blocks are repeated.

The present invention is made in consideration of the above-described situation, and an exemplary object of the present invention is to reduce the amount of computation required in determining a block size that is a unit for retaining motion information for a video coding method for performing motion estimation.

Solution to Problem

The present invention provides, as an aspect thereof, a computer-readable program recording medium recording a program for a video coding method for estimating motion. The program makes a computer execute: vector search processing of obtaining motion information of each of smallest blocks that are blocks belonging to a predefined deepest layer; block size determination processing of determining a block size that is a unit for retaining motion information; and block merging processing of, based on a merging condition that includes at least motion information of sub-blocks that are blocks belonging to a layer one layer deeper than a layer on which attention is currently focused, determining whether one or a plurality of sub-blocks that are adjacent to each other are merged into a block including a piece of motion information. The block size determination processing determines a block size by means of executing the block merging processing in a hierarchical manner in the order from blocks belonging to a layer one layer shallower than smallest blocks to a largest block that is a block belonging to a predefined shallowest layer.

The present invention provides, as another aspect thereof, a block size determination method for a video coding method for estimating motion. The block size determination method includes obtaining motion information of each of smallest blocks that are blocks belonging to a predefined deepest layer; determining a block size that is a unit for retaining motion information; and based on a merging condition that includes at least motion information of sub-blocks that are blocks belonging to a layer one layer deeper than a layer on which attention is currently focused, determining whether one or a plurality of sub-blocks that are adjacent to each other are merged into a block including a piece of motion information. The block size is determined by means of performing the determination in a hierarchical manner in the order from blocks belonging to a layer one layer shallower than smallest blocks to a largest block that is a block belonging to a predefined shallowest layer.

ADVANTAGEOUS EFFECTS OF INVENTION

FIG. 13 is a diagram for a description of blocks targeted by the block size determination processing;

FIG. 14 is a diagram for a description of blocks targeted by a motion vector search at a CU layer depth of 4 (depth=4);

FIG. 15 is a diagram for a description of blocks targeted by a motion vector search at a CU layer depth of 4 (depth=4);

FIG. 16 is a diagram for a description of blocks targeted by a motion vector search at a CU layer depth of 4 (depth=4);

FIG. 17 is a diagram for a description of blocks targeted by a motion vector search at a CU layer depth of 4 (depth=4);

FIG. 18 is a diagram for a description of blocks targeted by a motion vector search at a CU layer depth of 3 (depth=3);

FIG. 19 is a diagram for a description of blocks targeted by a motion vector search at a CU layer depth of 3 (depth=3);

FIG. 20 is a diagram for a description of blocks targeted by a motion vector search at a CU layer depth of 3 (depth=3);

FIG. 21 is a diagram for a description of blocks targeted by a motion vector search at a CU layer depth of 3 (depth=3);

FIG. 22 is a diagram for a description of blocks targeted by a motion vector search at a CU layer depth of 2 (depth=2);

FIG. 23 is a diagram for a description of blocks targeted by a motion vector search at a CU layer depth of 2 (depth=2);

FIG. 24 is a diagram for a description of blocks targeted by a motion vector search at a CU layer depth of 2 (depth=2);

FIG. 25 is a diagram for a description of blocks targeted by a motion vector search at a CU layer depth of 2 (depth=2)

EXAMPLE EMBODIMENTS

First Example Embodiment

Block size determination processing 1 that is a first example embodiment of the present invention will be described. The block size determination processing 1 is processing performed by a computer by specifying a variable "block" that indicates a block for which coding is to be performed, a variable "depth" that indicates a CU layer depth, and a variable "2N" that indicates a block size. In the present example embodiment, the CU layer depth "depth" is a natural number not less than 1 and not greater than 4. The block size "2N" is any of 8, 16, 32, and 64. An initial value of the CU layer depth "depth" is 1. An initial value of the block size "2N" is 64. As will be described later, the block size determination processing 1 is processing that includes a recursive call that calls the block size determination processing 1 itself.

The block size determination processing 1 will be described with reference to a flowchart in FIG. 1. First, the computer determines whether the CU layer depth "depth" is largest, that is, whether "depth" indicates a layer to which smallest size blocks belong (step S101).

When the determination results in true, that is, the CU layer depth "depth" is 4 (depth=4) and indicates a layer to which smallest size blocks belong, the computer performs a motion vector search with respect to the block to obtain motion information and, based on the motion information, calculates an RD cost for the block (step S106). The computer sets a current CU layer depth of 4 (depth=4) to a best depth "bestDepth" (bestDepth=4) (step S107) for returning.

When the determination results in false, that is, the CU layer depth "depth" is any of 1 to 3 and does not indicate the layer to which the smallest size blocks belong, the computer calls the block size determination processing 1 recursively (step S102). That is, the computer performs the block size determination processing 1 targeting each of sub-blocks that are created by partitioning the block by means of quad-tree segmentation.

When, in step S102, the block size determination processing 1 targeting respective four sub-blocks composing the block is finished, pieces of motion information of the respective sub-blocks are obtained at this point of time.

Figure 12:
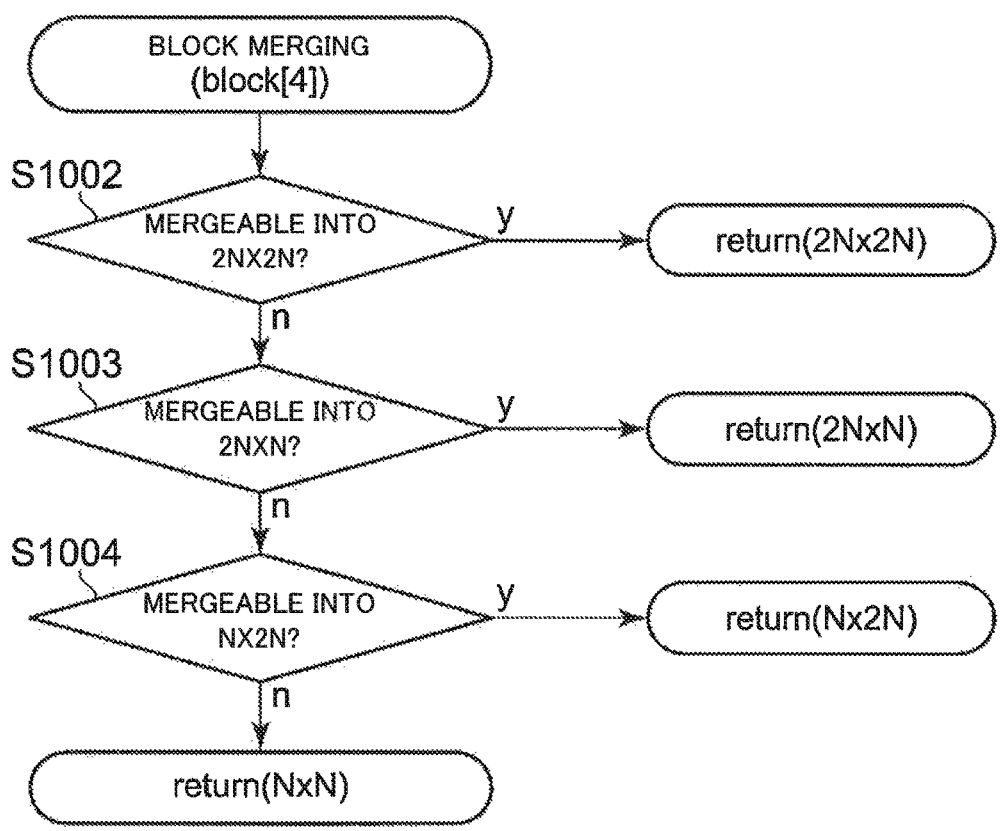
FIG. 12 is a flowchart for a description of the block size determination processing disclosed in NPL 2 and the block merging processing in the first example embodiment of the present invention.

In step S103, the computer performs block merging processing based on the pieces of motion information of the respective sub-blocks, which have been obtained in step S102, to determine a best block size "bestPart". For the block merging processing performed in this step, the block merging processing that was described above in the Background Art section with reference to FIG. 12 is used. The block merging processing is processing that returns any of 2N×2N, 2N×N, N×2N, and N×N as a best block size "bestPart".

In step S104, the computer compares an RD cost "bestPartCost" at the best block size "bestPart" with a cost that has been best "minCost" in magnitude. When the RD cost "bestPartCost" is smaller than the best cost "minCost" (y in step S104), the computer updates the best cost "minCost" with the value of the RD cost "bestPartCost" and updates the best depth "bestDepth" with the value of the CU layer depth at which the block size determination processing is currently performed (step S105).

In the block size determination processing, motion vector searches are performed at a timing as described below.

The computer performs processing for a CU layer depth of 4 (depth=4) in steps S106 and S107. Sub-blocks in the block size determination processing at a CU layer depth of 4 (depth=4) are 4×4 size blocks. In step S106, in particular, the computer performs motion vector searches targeting 8×8 size blocks 1 (FIG. 14), 2 (FIG. 15), 3 (FIG. 16), and 4 (FIG. 17).

The computer performs steps S102 to S105 as block size determination processing at a CU layer depth of 3 (depth=3) targeting a 16×16 size block that is made up of the 8×8 size blocks 1 to 4 (FIG. 18).

The computer performs a motion vector search targeting each of 8×8 size blocks 5 to 8 in step S106 in the same manner as in the above-described block size determination processing at a CU layer depth of 4 (depth=4) targeting the 8×8 size blocks 1 to 4. Further, the computer performs steps S102 to S105 as block size determination processing at a CU layer depth of 3 (depth=3) targeting a 16×16 size block that is made up of the 8×8 size blocks 5 to 8 (FIG. 19).

The computer performs a motion vector search targeting each of 8×8 size blocks 9 to 12 in step S106 in the same manner as in the above-described block size determination processing at a CU layer depth of 4 (depth=4) targeting the 8×8 size blocks 1 to 4. Further, the computer performs steps S102 to S105 as block size determination processing at a CU layer depth of 3 (depth=3) targeting a 16×16 size block that is made up of the 8×8 size blocks 9 to 12 (FIG. 20).

The computer performs a motion vector search targeting each of 8×8 size blocks 13 to 16 in step S106 in the same manner as in the above-described block size determination processing at a CU layer depth of 4 (depth=4) targeting the 8×8 size blocks 1 to 4. Further, the computer performs steps S102 to S105 as block size determination processing at a CU layer depth of 3 (depth=3) targeting a 16×16 size block that is made up of the 8×8 size blocks 13 to 16 (FIG. 21).

The computer performs steps S102 to S105 as block size determination processing at a CU layer depth of 2 (depth=2) targeting a 32×32 size block that is made up of the 8×8 size blocks 1 to 16 (FIG. 22). Sub-blocks in the block size determination processing at a CU layer depth of 2 (depth=2) are 16×16 size blocks.

The computer performs the same processing as the above-described block size determination processing at CU layer depths of 4, 3, and 2 (depth=4, 3, and 2) targeting the 8×8 size blocks 1 to 16, targeting each of 8×8 size blocks 17 to 32, 8×8 size blocks 33 to 48, and 8×8 size blocks 49 to 64.

Last, the computer performs steps S102 to S105 as block size determination processing at a CU layer depth of 1 (depth=1) targeting a 64×64 size block that is made up of all the blocks, that is, the 8×8 size blocks 1 to 64. Sub-blocks in the block size determination processing at a CU layer depth of 1 (depth=1) are 32×32 size blocks. While a lot of processing steps that can be executed in parallel are included in the above-described processing, a portion or all of the processing steps may be achieved by parallel processing.

As described above, according to the block size determination processing 1, the motion vector search processing is performed only when the CU layer depth is deepest, that is, only in step S106 in the block size determination processing at a depth of 4, and, in the block size determination processing at depths of 1 to 3, the motion vector search processing is not performed. Thus, using the block size determination processing 1 enables the amount of computation to be reduced compared with conventional methods that motion vector search processing is performed at each depth of 1 to 4.

Figure 11:
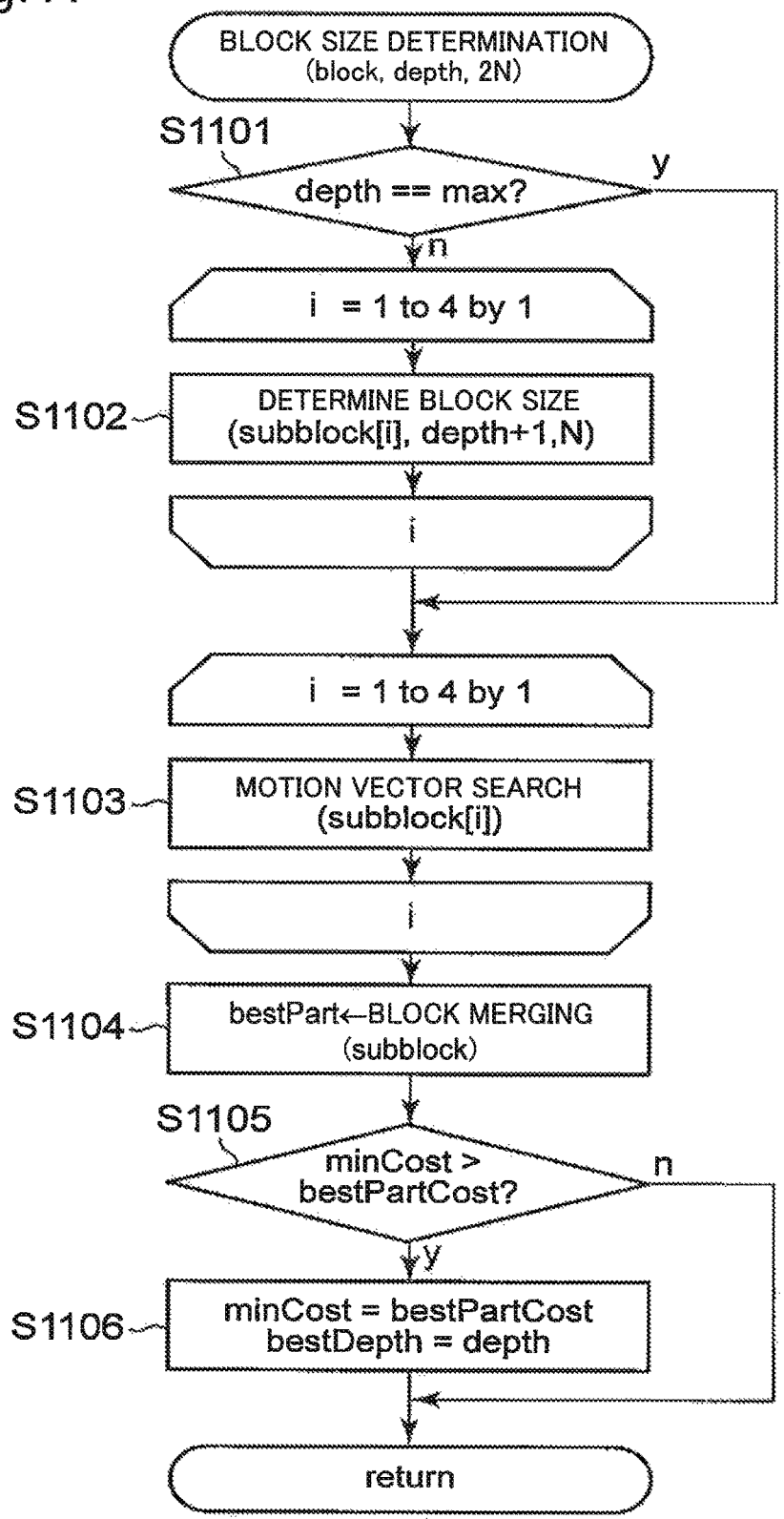
FIG. 11 is a flowchart for a description of block size determination processing disclosed in NPL 2.

According to NPL 2, as illustrated in step S1103 in FIG. 11, motion vector searches of sub-blocks are performed at each of CU layer depths of 1 to 4 (depth=1 to 4). At a CU layer depth of 4 (depth=4), motion vector searches are performed targeting 4×4 size blocks. At a CU layer depth of 3 (depth=3), motion vector searches are performed targeting 8×8 size blocks. At a CU layer depth of 2 (depth=2), motion vector searches are performed targeting 16×16 size blocks.

At a CU layer depth of 1 (depth=1), motion vector searches are performed targeting 32×32 size blocks. On the other hand, in the block size determination processing 1 of the present example embodiment, only motion vector searches at a CU layer depth of 4 (depth=4) targeting 4×4 size blocks are performed, and, at CU layer depths of 3, 2, and 1 (depth=3, 2, and 1), no motion vector search is performed.

The above-described first example embodiment was described under the assumption that, in the block merging processing, when motion vectors of mutually adjacent sub-blocks coincide with each other completely, the sub-blocks are merged. As a variation of the first example embodiment, the computer may calculate a difference between motion vectors of mutually adjacent sub-blocks and, when the difference is not greater than a predefined threshold value, consider that the motion vectors of the sub-blocks coincide with each other. In the present variation, the threshold value is assumed to be constant regardless of the CU layer depth.

Second Example Embodiment

Next, a second example embodiment of the present invention will be described. In the first example embodiment, the condition, in the block merging processing, for determining whether a plurality of sub-blocks can be merged is fixed regardless of the CU layer depth, and whether the sub-blocks can be merged is determined depending on whether motion vectors of adjacent sub-blocks coincide with each other. The above-described variation of the first example embodiment is the same in that whether sub-blocks can be merged is determined under an identical condition regardless of the CU layer depth, and whether the sub-blocks can be merged is determined depending on a result of comparison between a difference in motion vectors of adjacent sub-blocks and a predefined fixed threshold value.

On the other hand, in the second example embodiment, a condition for determining whether sub-blocks can be merged differs depending on the CU layer depth. The second example embodiment is the same as the first example embodiment in terms of the other features. Hereinafter, a description will be made mainly on the feature different from that of the first example embodiment.

Figure 1:
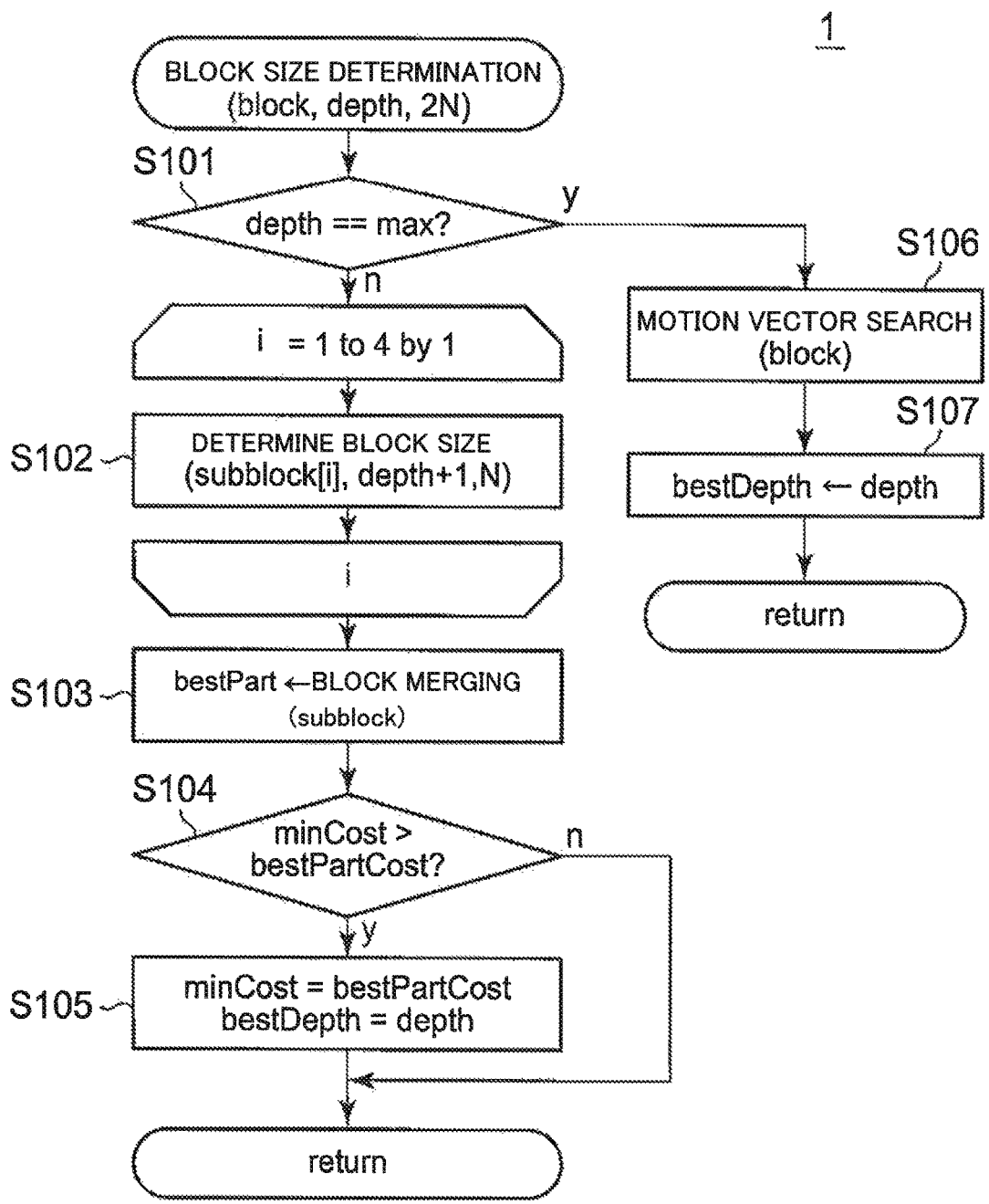
FIG. 1 is a flowchart for a description of an example of block size determination processing according to first to fourth example embodiments of the present invention.
Figure 2:
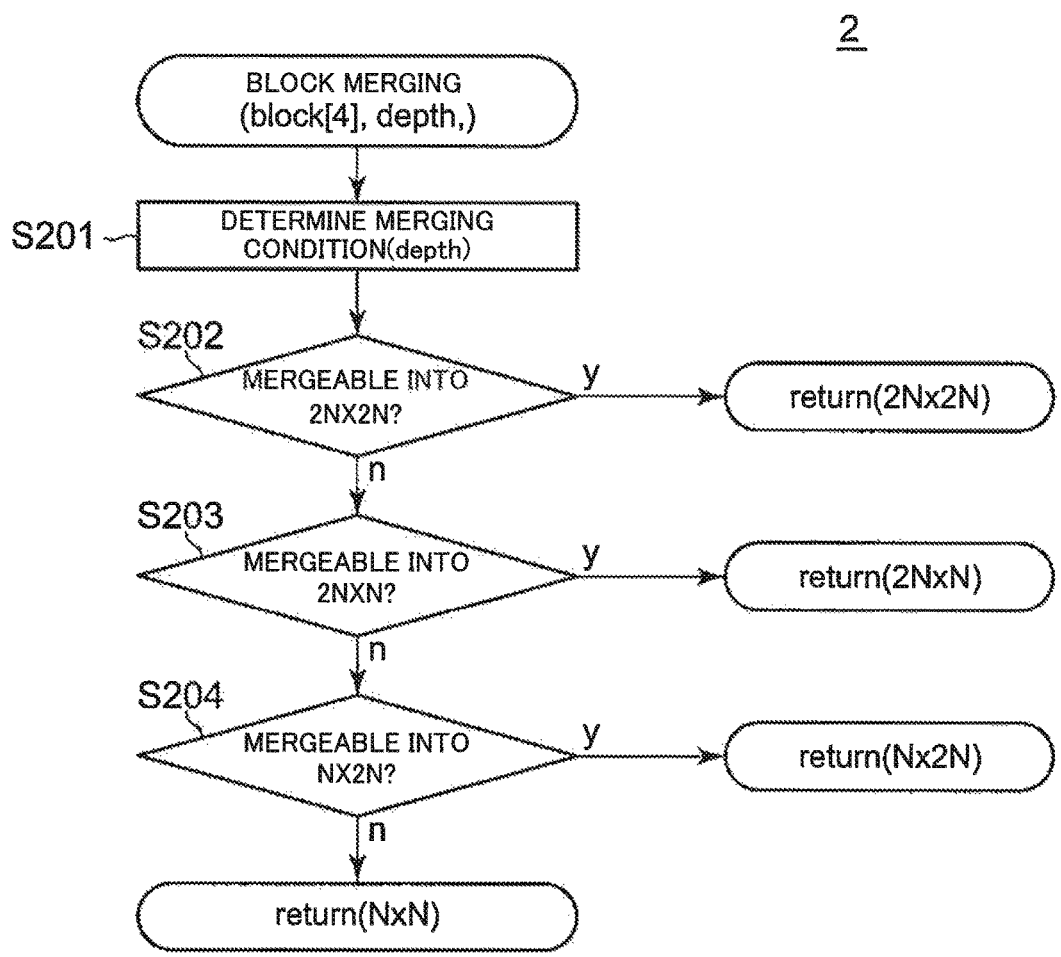
FIG. 2 is a flowchart for a description of block merging processing according to the second example embodiment of the present invention.

In the second example embodiment, in place of the block merging processing performed in step S103 in FIG. 1, block merging processing 2 illustrated in FIG. 2 is performed. The block merging processing 2 takes a CU layer depth "depth" as an argument in addition to to-be-merged sub-blocks "block". In step S201, a computer determines a determination condition to be used in steps S202, S203, and S204 depending on the CU layer depth "depth".

In the present example embodiment, it is assumed that a determination condition that is used in determining whether a plurality of sub-blocks can be merged is referred to as a merging condition and processing of determining a merging condition is referred to as merging condition determination processing. In the block merging processing 2, the computer determines a determination condition depending on the CU layer depth "depth". Since, through the merging condition determination processing, the computer determines whether sub-blocks need to be merged depending on the layer depth, an improvement in image quality and an improvement in compression efficiency may be achieved.

Figure 3:
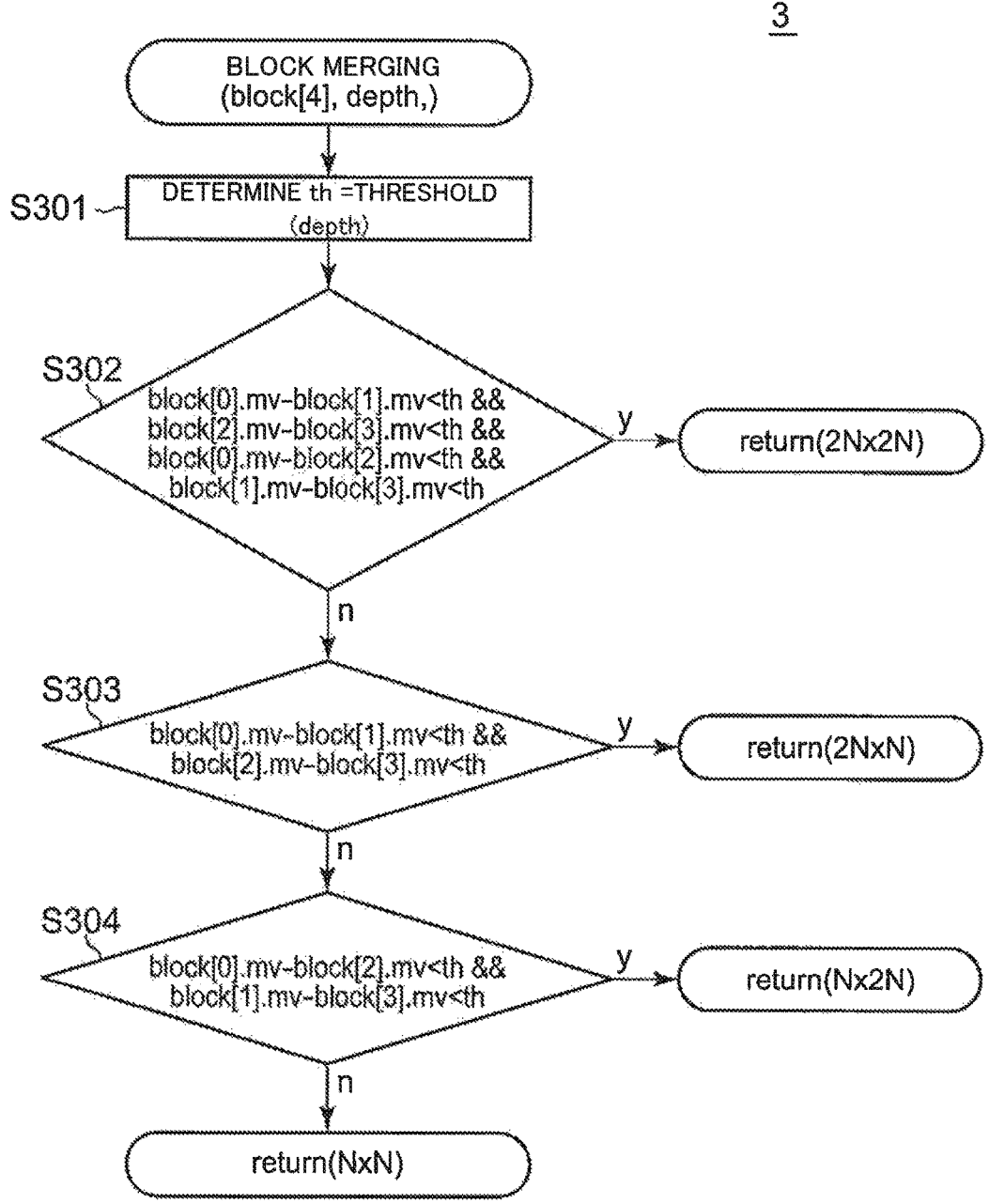
FIG. 3 is a flowchart for a description of the block merging processing according to the second example embodiment of the present invention.

Examples of the block merging processing 2 include block merging processing 3. Referring to FIG. 3, in merging condition determination processing in step S301 in the block merging processing 3, the computer determines a threshold value for a motion vector difference between sub-blocks depending on the CU layer depth "depth". In the variation of the first example embodiment, in determining whether adjacent sub-blocks move in the same direction, a difference between motion vectors of adjacent sub-blocks is obtained and, when the difference is not greater than a predefined threshold value, the motion vectors of the sub-blocks are determined to coincide with each other. The threshold value referenced on this occasion is fixed regardless of the CU layer depth "depth". On the other hand, in the block merging processing 3, different threshold values are used depending on the CU layer depth "depth".

In general, as layer depth becomes deeper, that is, block size becomes smaller, the amount of code required for expressing motion information increases. In the block merging processing 3, a threshold value "th" is assumed to be the CU layer depth "depth" in step S301.

The computer is configured to vary, depending on the CU layer depth "depth", a determination condition used in determining, in subsequent steps S302 to S304, whether sub-blocks can be merged. For example, when four blocks "block[0]", "block[1]", "block[2]", and "block[3]" are arranged in a quad-tree structure, an operation of comparing a difference between motion information "block[0].mv" of the block "block[0]" and motion information "block[1].mv" of the block "block[1]" with the threshold value "th" is expressed as block[0].mv-block[1].mv<th in step S302.

In the same manner, an operation of comparing a difference between motion information "block[2].mv" of the block "block[2]" and motion information "block[3].mv" of the block "block[3]" with the threshold value "th" is expressed as block[2].mv-block[3].mv<th. Further, an operation of comparing a difference between motion information "block[0].mv" of the block "block[0]" and motion information "block[2].mv" of the block "block[2]" with the threshold value "th" is expressed as block[0].mv-block[2].mv<th. Furthermore, an operation of comparing a difference between motion information "block[1].mv" for the block "block[1]" and motion information "block[3].mv" of the block "block[3]" with the threshold value "th" is expressed as block[1].mv-block[3].mv<th. The conditions expressed by the four inequalities are joined by signs "&&", each of which denotes a logical product. Steps S303 and S304 and, additionally, steps S602 to S604 in FIG. 6, which will be described later, are also described in the same notation method.

When configured in such a manner, while, as the CU layer depth increases, a larger threshold value "th" is set and it becomes easier to merge blocks, as the CU layer depth decreases, a smaller threshold value "th" is set and it becomes harder to merge blocks.

In step S302, in which merging determination into a 2N×2N block is performed, the computer calculates differences between pieces of motion information of adjacent sub-blocks and, if all the four vector differences are not greater than the threshold value, determines to merge the sub-blocks into a 2N×2N block. In step S303, in which merging determination into 2N×N blocks is performed, if all the differences between pieces of motion information of laterally adjacent sub-blocks are not greater than the threshold value, the computer determines to merge the sub-blocks into 2N×N blocks. In step S304, in which merging determination into N×2N blocks is performed, if all the differences between pieces of motion information of longitudinally adjacent sub-blocks are not greater than the threshold value, the computer determines to merge the sub-blocks into N×2N blocks.

As another example of the block merging processing 2, it is conceivable that the number of sub-blocks the pieces of motion information of which coincide with each other in determining to merge the four sub-blocks into a 2N×2N block is varied depending on the CU layer depth "depth". In the case of a deep layer, that is, in the case of a large CU layer depth "depth", when the pieces of motion information of any three out of the four sub-blocks coincide with one another, the computer determines to merge the four sub-blocks. On the other hand, in the case of a shallow layer, that is, in the case of a small CU layer depth "depth", when the pieces of motion information of all the four sub-blocks coincide with one another, the computer determines to merge the four sub-blocks.

The present example embodiment enables a more proper block size to be selected and coding efficiency to be improved.

Third Example Embodiment

Figure 4:
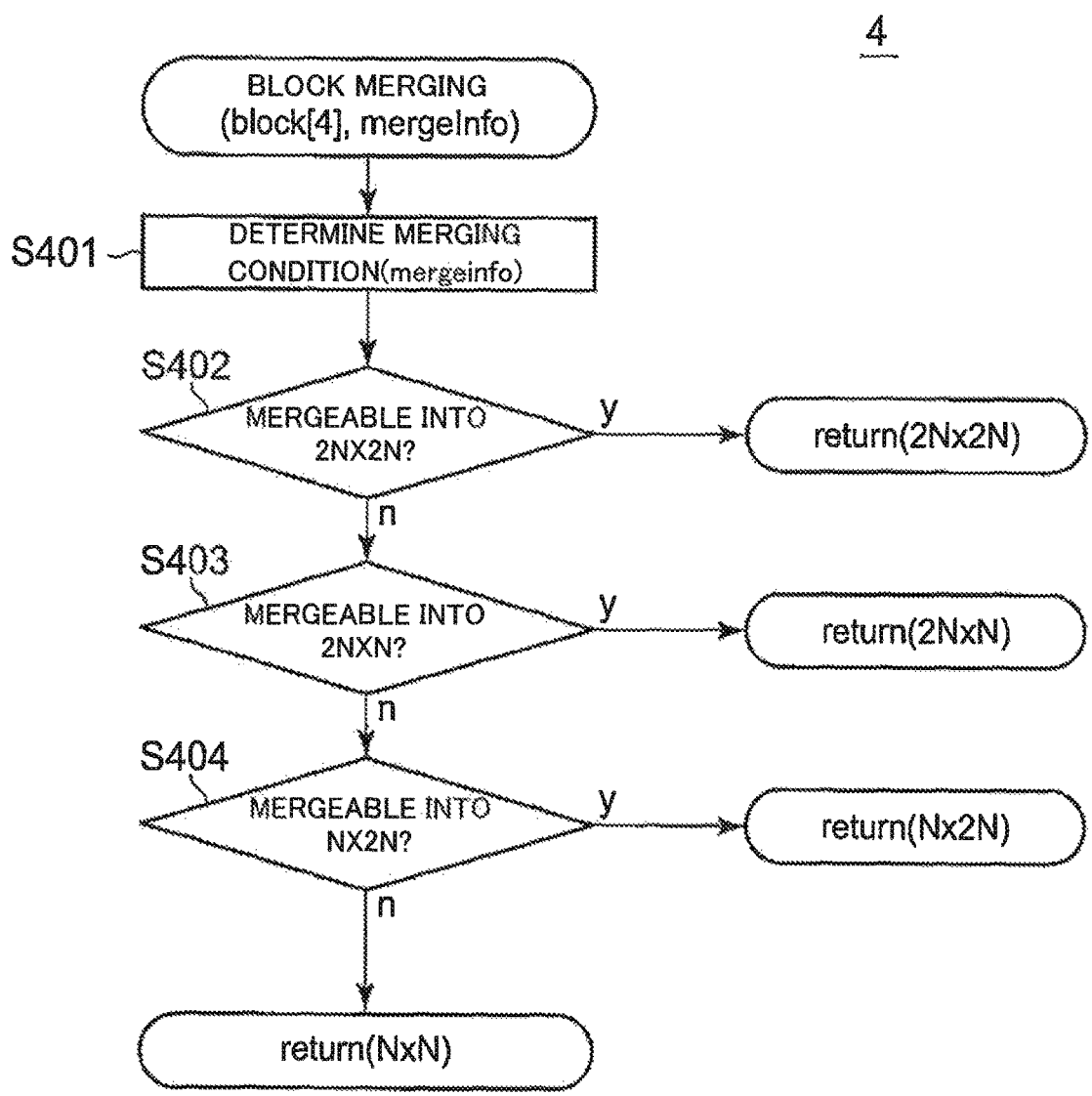
FIG. 4 is a flowchart for a description of block merging processing according to the third example embodiment of the present invention.

Next, a third example embodiment will be described. In the third example embodiment, in place of the block merging processing in step S203 in the block size determination processing 1, block merging processing 4 illustrated in FIG. 4 is used. The other operations are the same as those of the block size determination processing 1 of the first example embodiment.

In the block merging processing 4, a computer uses block merging information "mergeInfo" as a merging condition. The block merging information "mergeInfo" is information on a result from block merging processing performed at a deeper layer. Thus, the block merging processing 4 takes the block merging information "mergeInfo" as an argument in addition to to-be-merged sub-blocks "block". In step S401, the computer determines a determination condition to be used in steps S402, S403, and S404 depending on the block merging information "mergeInfo".

Figure 5:
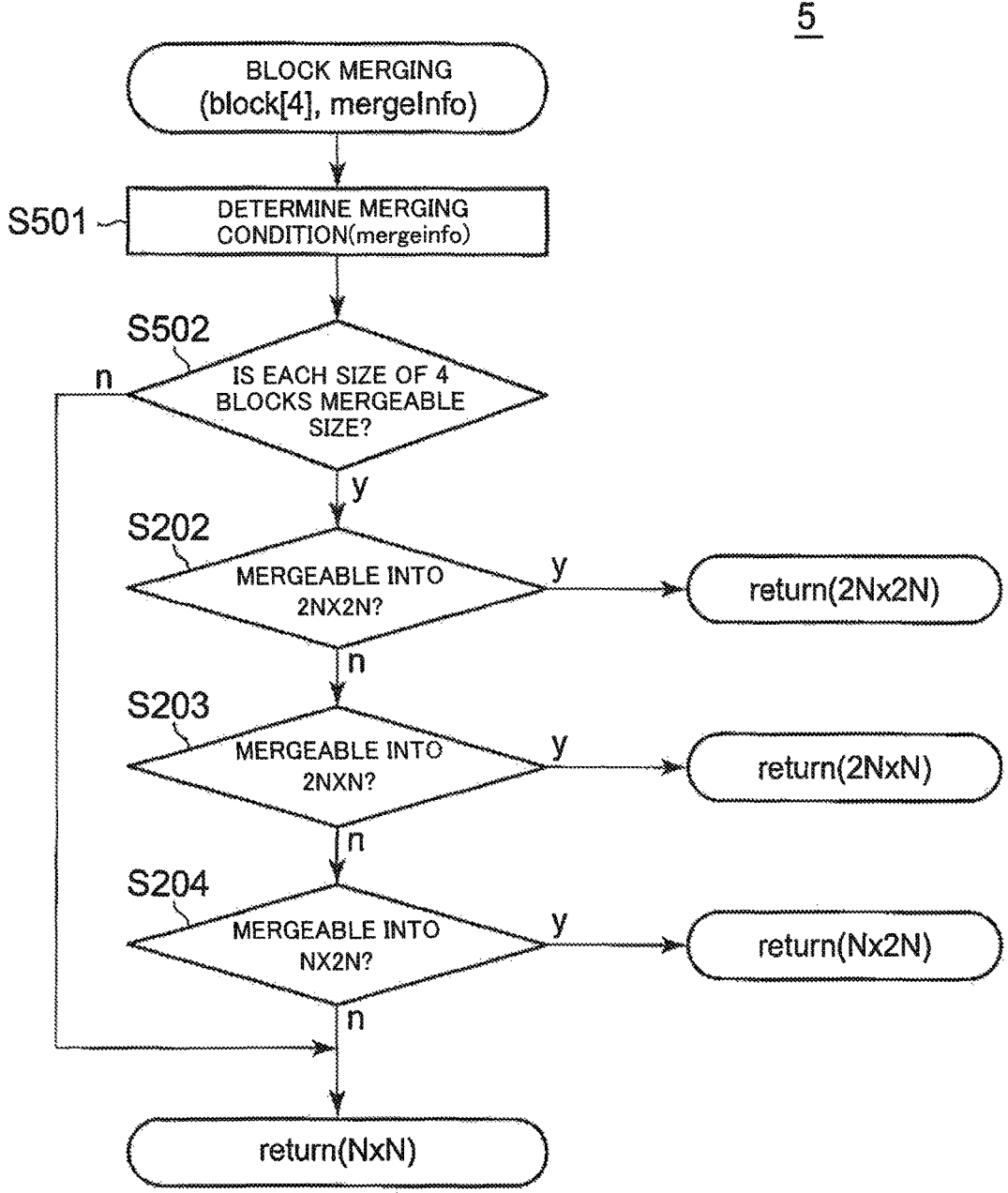
FIG. 5 is a flowchart for a description of the block merging processing according to the third example embodiment of the present invention.

As an example of the block merging processing 4, block merging processing 5 that sets a determination condition using the block sizes of merged blocks as the block merging information "mergeInfo" is illustrated in FIG. 5. For example, it is assumed that, in determining whether blocks can be merged in the order from a deep CU layer depth to a shallow CU layer depth, there is a case in which blocks have not been merged at a CU layer depth deeper than a current CU layer depth. In such a case, without performing comparison of pieces of motion information, it is possible to determine that the pieces of motion information of sub-blocks at the current CU layer depth do not coincide with one another. The block merging processing 5 is processing that is configured with the above characteristic taken into consideration.

Figure 10:
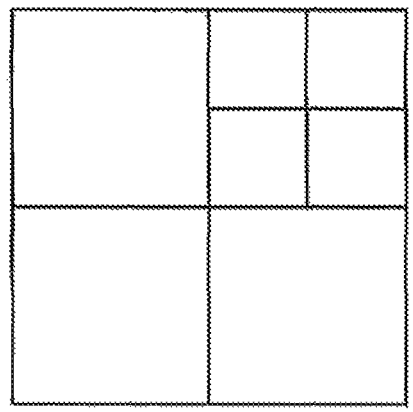
FIG. 10 is a diagram for a description of an operation of, based on a merging condition including block merging information "mergeinfo", determining whether the execution of the block merging processing is needed.

The computer determines a merging condition in step S501. The merging condition includes a condition under which, for example, if there exists at least one out of four sub-blocks that, as upper right blocks in FIG. 10, has not been merged into a 2N×2N block at a deeper layer, the sub-blocks are not to be merged. The computer, in step S502, assesses the block merging information "mergeInfo" based on the merging condition to determine whether the respective four sub-blocks have a size allowing the sub-blocks to be merged.

When being determined to be false in step S502, the computer determines that the blocks may not be merged (size N×N) without performing subsequent conditional determination. In this case, the computer skips performance of processing of determining whether the blocks can be merged into a 2N×2N block, 2N×N blocks, or N×2N blocks in steps S202 to S204, and the required amount of computation is thus reduced correspondingly.

On the other hand, when being determined to be true in step S502, the computer performs steps S202 to S204 in the above-described block merging processing 2 to determine whether to merge the sub-blocks into a 2N×2N block, 2N×N blocks, or N×2N blocks.

The computer may be configured to perform, in place of steps S202 to S204 in the block merging processing 2, the block merging processing 3 or the block merging processing 4.

According to the present example embodiment, since whether performing determination processing as to whether four sub-blocks can be merged into a 2N×2N block, 2N×N blocks, or N×2N blocks is needed is determined in step S502 based on a result from block merging processing performed at a deeper CU layer depth "depth" and, if the processing is not needed, the performance of the determination processing is omitted, the amount of computation in the block merging processing may be reduced.

Fourth Example Embodiment

Figure 6:
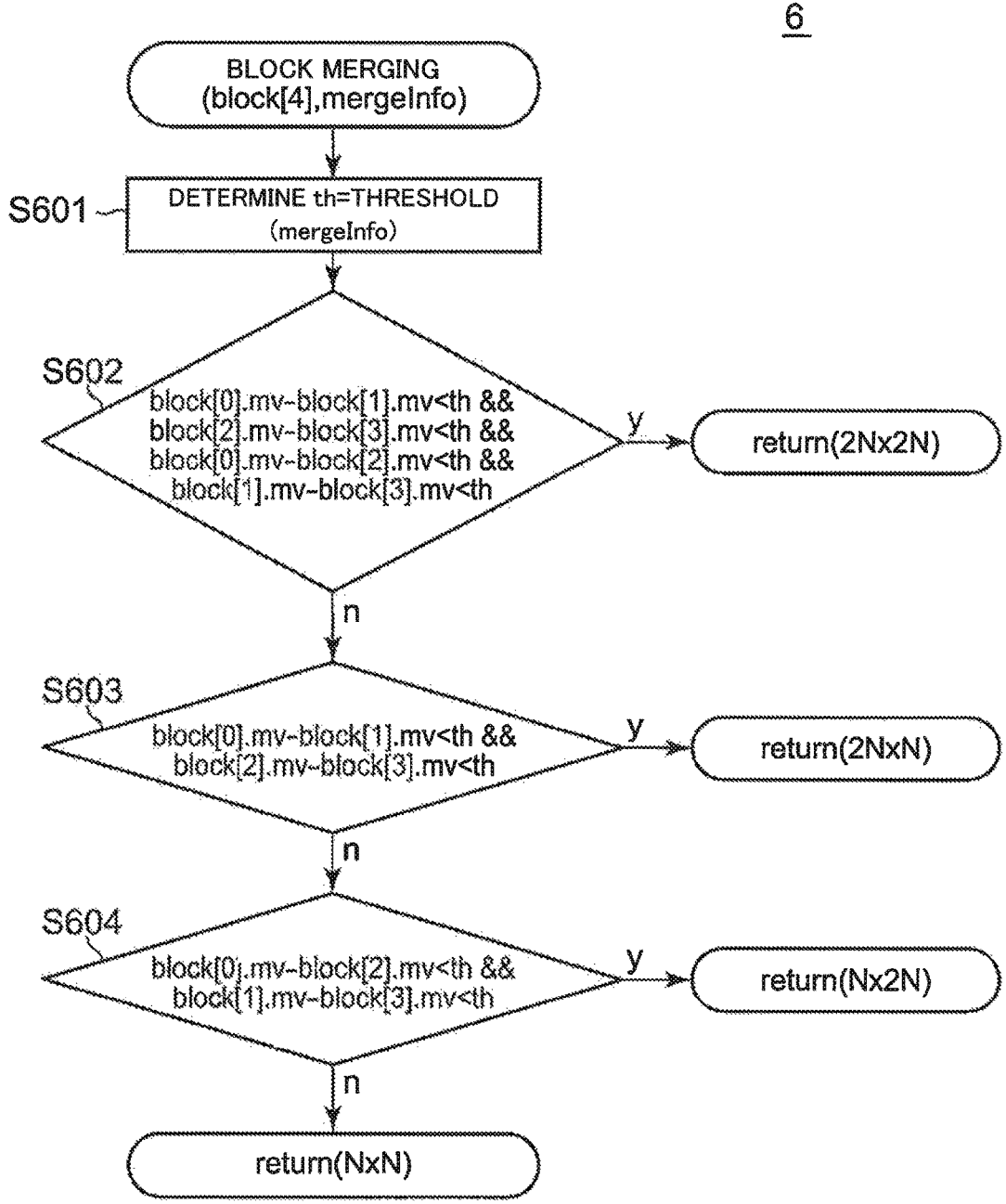
FIG. 6 is a flowchart for a description of block merging processing according to the fourth example embodiment of the present invention.
Figure 7:
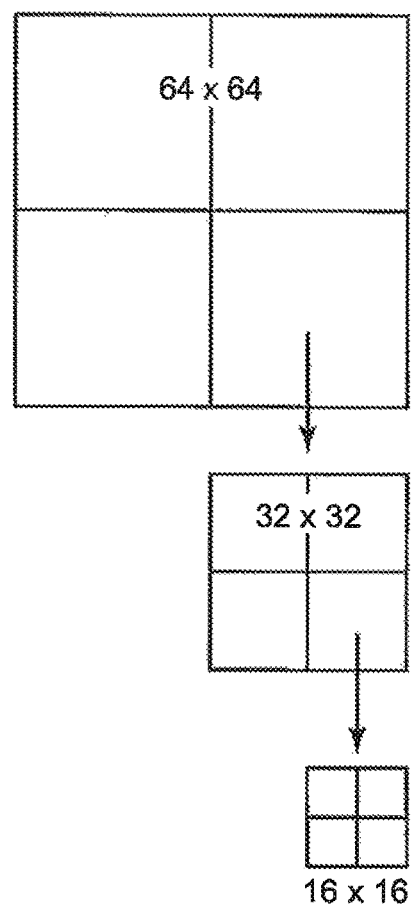
FIG. 7 is a diagram for a description of blocks obtained by partitioning a 64×64 size CU by means of quad-tree segmentation.
Figure 8:
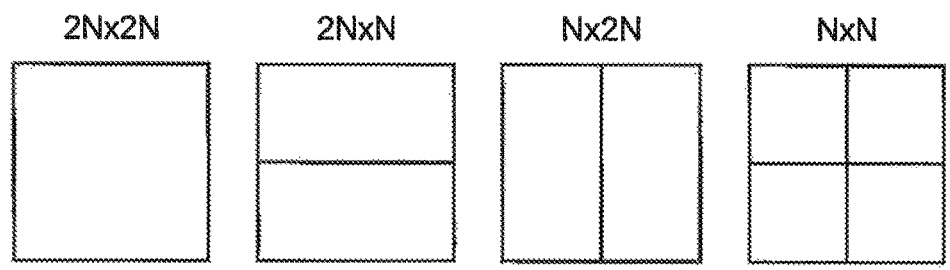
FIG. 8 is a diagram for a description of a relation between a 2N×2N size CU and 2N×2N, 2N×N, N×2N, and N×N size PUs.
Figure 9:
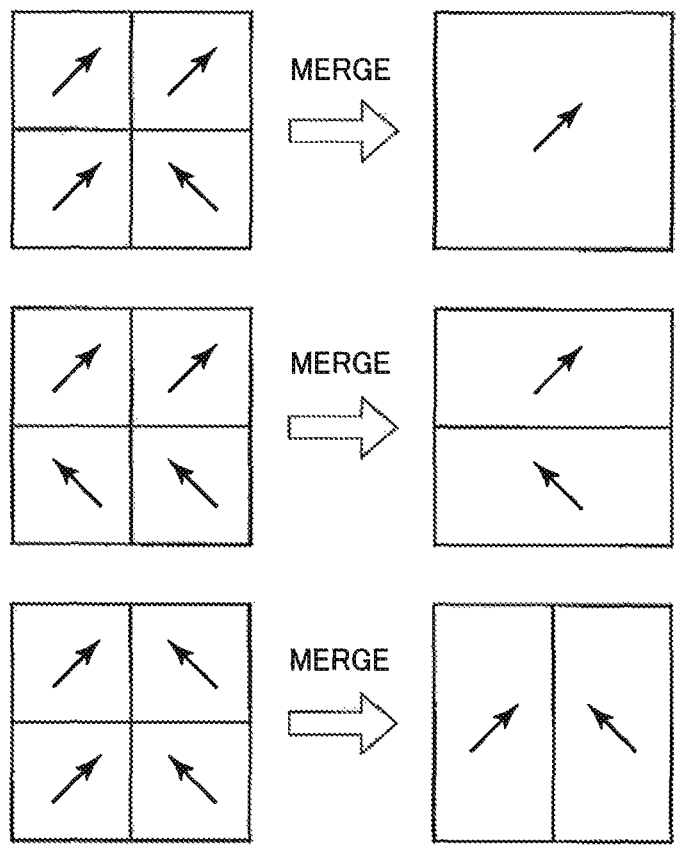
FIG. 9 is a diagram for a description of block merging performed based on motion information.

In the present example embodiment, as with the third example embodiment, a condition for determining whether blocks can be merged is determined based on a result from block merging processing performed at a deeper CU layer depth. In a fourth example embodiment, in place of the block merging processing in step S203 in the block size determination processing 1, block merging processing 6 illustrated in FIG. 6 is used. The other operations are the same as those of the block size determination processing 1 of the first example embodiment.

In step S601, the computer determines a threshold value to be compared with differences between the motion vectors of adjacent sub-blocks based on sub-block information at a layer(s) deeper than a current CU layer depth "depth". In general, as the number of small blocks increases, the amount of code expressing motion information increases. In consideration of the above characteristic, in the present example embodiment, the computer increases the threshold value when the number of sub-blocks having been merged at a deep CU layer depth(s) is small (when the number of sub-blocks having not been merged is large). On the other hand, the computer decreases the threshold value when the number of sub-blocks having been merged at a deep CU layer depth(s) is large (when the number of sub-blocks having not been merged is small). Whether the number of sub-blocks having been merged at a deep CU layer depth(s) is large or small is determined in such a way that, for example, a threshold value is separately defined in advance, and the number of sub-blocks is determined to be large in the case of being larger than the threshold value and determined to be small in the case of being smaller than the threshold value.

When configured in such a manner, when the number of sub-blocks having been merged at a deep CU layer depth(s) is small, a difference between the motion vectors of adjacent sub-blocks is likely to be smaller than the threshold value "th", which causes the determination in steps S602 to S604 to become likely to result in true. Therefore, a case may occurs in which even blocks that could not be merged at a deep CU layer depth can be merged at a shallow CU layer depth. As a result, the block size determination processing of the present example embodiment enables compression efficiency and image quality to be improved.

The present invention was described above in accordance with the example embodiments thereof, but the present invention is not limited to the above example embodiments. That is, various modes that could be understood by a person skilled in the art may be applied to the present invention within the scope of the present invention.

Although, in the above-described example embodiments, a method using quad-tree segmentation was described as a method of block partitioning, the present invention is not limited to the method.

For example, although a 64×64 block is partitioned into four 32×32 blocks in the above-described example embodiments, instead, it may be configured to partition a 64×64 block into 16 16×16 blocks.

Although a square block is partitioned into four square blocks in the above-described example embodiments, both the shape of a block to be partitioned and the shape of a partitioned block are not limited to a square. For example, the method of partitioning may be a method of partitioning a square block into two rectangular blocks or a method of partitioning a rectangular block into two square blocks.

In the above-described example embodiments, the shape of a block is square at any CU layer depth, in other words, the shapes of blocks are similar regardless of the CU layer depth. However, the shape of a block is not limited to the above configuration, and blocks with a different shape may be used with for each CU layer depth. For example, blocks may be square 64×64 blocks, rectangular 64×32 blocks, and square 32×32 blocks in the first layer, the second layer, and the third layer, respectively.

Although, in the above-described example embodiments, descriptions were made under the assumption that block sizes were 2N×2N, 2N×N, N×2N, and N×N, the block sizes are not limited to the sizes. For example, the example embodiments are also operable in the case of using a partitioning method such as AMP (Asymmetric motion partitions) in H.265 and other partitioning methods.

Although, in the above-described example embodiments, whether blocks can be merged was determined based on motion vectors, the present invention is not limited to the configuration. For example, the above determination may be performed based on such information as a reference frame index and reference direction. In the case of dealing with motion vectors corresponding to different reference frames, motion vector information that is obtained by performing scaling in accordance with inter-frame distances may be used.

A condition for determining whether blocks are to be merged may be weighted in accordance with the sizes of small blocks retaining respective motion vectors or the RD costs of the respective small blocks.

After a block size has been determined by means of the block merging processing as described in each of the above-described example embodiments, a motion vector search may be performed again only to the determined block size. Performing such processing also enables image quality to be improved with a low amount of computation.

Figure 26:
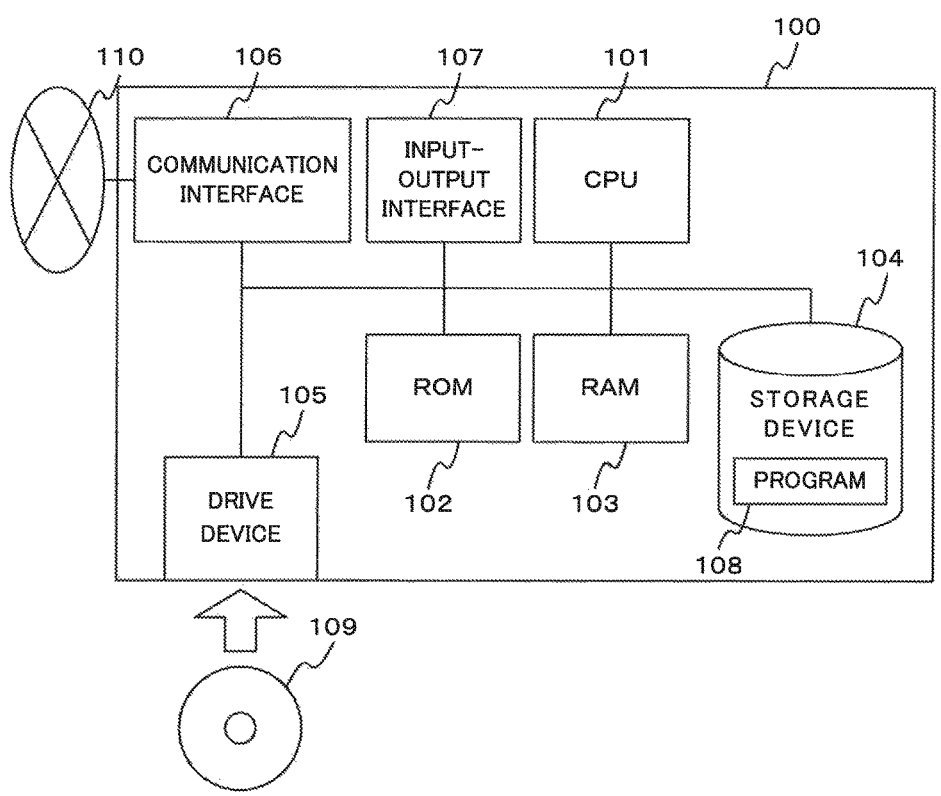
FIG. 26 is a block diagram illustrating an example of a computer.

FIG. 26 is a block diagram illustrating an example of a hardware configuration of the computer in the above-described example embodiments. A computer 100 includes a CPU (Central Processing Unit) 101, a ROM (Read Only Memory) 102, a RAM (Random Access Memory) 103, a storage device 104, a drive device 105, a communication interface 106, and an input-output interface 107.

The CPU 101 executes a program 108 stored in the storage device 104 using the RAM 103. The program 108 may be stored in the ROM 102. The program 108 may be not only recorded in a recording medium 109 and read by the drive device 105 but also transmitted from an external device by way of a network 110. The communication interface 106 exchanges data with the external device by way of the network 110. The input-output interface 107 exchanges data with peripheral devices (a keyboard, a mouse, a display device, and so on). The communication interface 106 and the input-output interface 107 may function as means for acquiring or outputting data. Data needed for determination of a block size may be stored in the storage device 104 or included in the program 108.

A portion or all portions of components composing a computer may be achieved by a general purpose or dedicated circuit, a processor, or the like or a combination thereof. The components may be configured with a single chip or a plurality of chips.

A part of all parts of the example embodiments described above may be described as in the following supplemental notes, but the present invention is not limited thereto.

(Supplemental Note 1)

A program that, for a video coding method for estimating motion, makes a computer execute processing of determining a block size that is a unit for retaining motion information, the program making the computer execute:

when a block belonging to a predefined shallowest layer is referred to as a largest block, blocks into which a largest block is partitioned and that belong to a predefined deepest layer are referred to as smallest blocks, a block belonging to a layer on which attention is currently focused is referred to as a current block, and blocks belonging to a layer one layer deeper than a layer on which attention is currently focused are referred to as sub-blocks, vector search processing of obtaining motion information of each of smallest blocks; and block merging processing of, based on a merging condition that includes at least motion information of sub-blocks, determining whether one or a plurality of sub-blocks that are adjacent to each other are merged into a block including a piece of motion information, wherein a block size is determined by means of executing the block merging processing in a hierarchical manner in the order from blocks belonging to a layer one layer shallower than smallest blocks to a largest block.

(Supplemental Note 2)

The program according to supplemental note 1, wherein the merging condition includes another piece of information of motion information of sub-blocks, and the program further makes the computer execute merging condition determination processing of determining the merging condition at a layer on which attention is currently focused based on the another piece of information.

(Supplemental Note 3)

The program according to supplemental note 2, wherein the another piece of information is a depth of a layer on which attention is currently focused.

(Supplemental Note 4)

The program according to supplemental note 2, wherein the another piece of information is information relating to a result from block merging processing at a layer deeper than a layer on which attention is currently focused.

(Supplemental Note 5)

The program according to any one of supplemental notes 1 to 4, wherein the merging condition includes a condition that is defined based on a comparison between a difference in motion information between adjacent sub-blocks and a predefined threshold value related to the difference.

(Supplemental Note 6)

The program according to supplemental note 5, wherein the merging condition includes a depth of a layer on which attention is currently focused, and the program further makes the computer execute processing of defining a threshold value related to the difference depending on a depth of a layer on which attention is currently focused.

(Supplemental Note 7)

The program according to any one of supplemental notes 1 to 6, the program further making the computer execute processing of, based on a result from block merging processing at a layer deeper than a layer on which attention is currently focused, determining whether execution of block merging processing at a layer on which attention is currently focused is needed.

(Supplemental Note 8)

A block size determination method that is a method for, for a video coding method for estimating motion, determining a block size that is a unit for retaining motion information, the block size determination method comprising:

when a block belonging to a predefined shallowest layer is referred to as a largest block, blocks into which a largest block is partitioned and that belong to a predefined deepest layer are referred to as smallest blocks, a block belonging to a layer on which attention is currently focused is referred to as a current block, and blocks belonging to a layer one layer deeper than a layer on which attention is currently focused are referred to as sub-blocks, a step of executing, with a processing device, vector search processing of obtaining motion information of each of smallest blocks; and a step of executing, with the processing device, block merging processing of, based on a merging condition that includes at least motion information of sub-blocks, determining whether one or a plurality of sub-blocks that are adjacent to each other are merged into a block including a piece of motion information;

wherein a block size is determined by means of executing the block merging processing in a hierarchical manner in the order from blocks belonging to a layer one layer shallower than smallest blocks to a largest block.

(Supplemental Note 9)

The block size determination method according to supplemental note 8, wherein the merging condition includes another piece of information of motion information of sub-blocks, and the block size determination method further includes a step of executing, with the processing device, merging condition determination processing of determining the merging condition at a layer on which attention is currently focused based on the another piece of information.

(Supplemental Note 10)

The block size determination method according to supplemental note 9, wherein the another piece of information is a depth of a layer on which attention is currently focused.

(Supplemental Note 11)

The block size determination method according to supplemental note 9, wherein the another piece of information is information relating to a result from block merging processing at a layer deeper than a layer on which attention is currently focused.

(Supplemental Note 12)

The block size determination method according to any one of supplemental notes 8 to 11, wherein the merging condition includes a condition that is defined based on a comparison between a difference in motion information between adjacent sub-blocks and a predefined threshold value related to the difference.

(Supplemental Note 13)

The block size determination method according to supplemental note 12, wherein the merging condition includes a depth of a layer on which attention is currently focused, and the block size determination method further includes a step of executing, with the processing device, processing of defining a threshold value related to the difference depending on a depth of a layer on which attention is currently focused.

(Supplemental Note 14)

The block size determination method according to any one of supplemental notes 8 to 13, the block size determination method further comprising:

a step of executing, with the processing device, processing of, based on a result from block merging processing at a layer deeper than a layer on which attention is currently focused, determining whether execution of block merging processing at a layer on which attention is currently focused is needed.

REFERENCE SIGNS LIST

1 Block size determination processing
2 to 6 Block merging processing
100 Computer

The invention claimed is:

1. A non-transitory computer-readable program recording medium recording a program for a video coding method for estimating motion, the program making a computer execute:

vector search processing of obtaining motion information of each of smallest blocks that are blocks belonging to a predefined deepest layer;

block size determination processing of determining a block size that is a unit for retaining motion information; and block merging processing of, based on a merging condition that includes at least motion information of sub-blocks that are blocks belonging to a layer one layer deeper than a layer on which attention is currently focused, determining whether one or a plurality of sub-blocks that are adjacent to each other are merged into a block including a piece of motion information;

wherein the block size determination processing determines a block size by means of executing the block merging processing in a hierarchical manner in the order from blocks belonging to a layer one layer shallower than the smallest blocks to a largest block that is a block belonging to a predefined shallowest layer, wherein the merging condition includes a condition that is defined based on a comparison between a difference in motion information between adjacent sub-blocks and a threshold value related to the difference, and wherein the merging condition includes a depth of a layer on which attention is currently focused, and the program further makes the computer execute processing of defining a threshold value related to the difference depending on a depth of a layer on which attention is currently focused.

2. The non-transitory computer-readable program recording medium according to claim 1, wherein
the merging condition includes another piece of information of motion information of sub-blocks; and
the program further makes the computer execute merging condition determination processing of determining the merging condition at a layer on which attention is currently focused based on the another piece of information.

3. The non-transitory computer-readable program recording medium according to claim 2, wherein
the another piece of information is a depth of a layer on which attention is currently focused.

4. The non-transitory computer-readable program recording medium according to claim 2, wherein
the another piece of information is information relating to a result from the block merging processing at a layer deeper than a layer on which attention is currently focused.

5. The non-transitory computer-readable program recording medium according to claim 1, the program further making the computer execute:
processing of, based on a result from the block merging processing at a layer deeper than a layer on which attention is currently focused, determining whether execution of the block merging processing at a layer on which attention is currently focused is needed.

6. A block size determination method for a video coding method for estimating motion, the block size determination method comprising:
obtaining motion information of each of smallest blocks that are blocks belonging to a predefined deepest layer;
determining a block size that is a unit for retaining motion information; based on a merging condition that includes at least motion information of sub-blocks that are blocks belonging to a layer one layer deeper than a layer on which attention is currently focused, determining whether one or a plurality of sub-blocks that are adjacent to each other are merged into a block including a piece of motion information;
wherein the block size is determined by means of performing the determination in a hierarchical manner in the order from blocks belonging to a layer one layer shallower than the smallest blocks to a largest block that is a block belonging to a predefined shallowest layer,
wherein the merging condition includes a condition that is defined based on a comparison between a difference in motion information between adjacent sub-blocks and a threshold value related to the difference, and
wherein the merging condition includes a depth of a layer on which attention is currently focused, and
defining a threshold value related to the difference depending on a depth of a layer on which attention is currently focused.

7. The block size determination method according to claim 6, wherein
the merging condition includes another piece of information of motion information of sub-blocks, and
the block size determination method further comprises determining the merging condition at a layer on which attention is currently focused based on the another piece of information.

8. The block size determination method according to claim 7, wherein
the another piece of information is a depth of a layer on which attention is currently focused.

* * * * *

UNITED STATES PATENT AND TRADEMARK OFFICE
CERTIFICATE OF CORRECTION

| | | |
|---|---|---|
| PATENT NO. | : 10,356,403 B2 | Page 1 of 1 |
| APPLICATION NO. | : 15/506803 | |
| DATED | : July 16, 2019 | |
| INVENTOR(S) | : Fumiyo Takano | |

It is certified that error appears in the above-identified patent and that said Letters Patent is hereby corrected as shown below:

On the Title Page

Column 1, (54) Title, Line 1; Delete "HIERARCHIAL" and insert --HIERARCHICAL-- therefor In the Specification Column 1, Title, Line 1; Delete "HIERARCHIAL" and insert --HIERARCHICAL-- therefor Column 7, Advantageous Effects of Invention, Line 48; After "INVENTION", insert --¶According to the present invention, since motion information of the smallest blocks is obtained first and, subsequently, by use of the motion information as a starting point, block sizes are determined by performing block merging processing with respect to each layer in the order from blocks belonging to a layer one layer shallower than smallest blocks to a largest block, performing a vector search with respect to each layer is not needed. For this reason, the amount of computation may be reduced.
BRIEF DESCRIPTION OF DRAWINGS--

In the Claims

Column 19, Line 34; In Claim 6, after "information;", insert --¶--

Signed and Sealed this
Twenty-ninth Day of October, 2019

Andrei Iancu
*Director of the United States Patent and Trademark Office*